United States Patent [19]

Ramsey et al.

[11] Patent Number: 5,045,649

[45] Date of Patent: Sep. 3, 1991

[54] SELF-ADJUSTING SLIDE ASSEMBLY FOR WEIGHT ON GEAR SWITCH

[75] Inventors: William D. Ramsey, Hurst; George H. Bailey, Fort Worth, both of Tex.

[73] Assignee: Bell Helicopter Textron Inc., Fort Worth, Tex.

[21] Appl. No.: 424,291

[22] PCT Filed: Oct. 3, 1989

[86] PCT No.: PCT/US89/04220

§ 371 Date: Oct. 3, 1989

§ 102(e) Date: Oct. 3, 1989

[51] Int. Cl.⁵ .................... H01H 35/00; B64C 27/00
[52] U.S. Cl. ........................ 200/52 R; 200/85 R; 244/17.13
[58] Field of Search ............ 200/52 R, 61.41, 61.42, 200/61.58 R, 85 R; 244/17.17, 100 R, 108, 17.13

[56] References Cited

U.S. PATENT DOCUMENTS

| | | | |
|---|---|---|---|
| 2,722,587 | 11/1955 | Buzzetti et al. | 338/2 |
| 2,850,121 | 9/1958 | Curl et al. | 188/1 A |
| 2,887,672 | 5/1959 | Morano et al. | 200/85 R X |
| 2,913,072 | 11/1959 | Williams | 188/1 A |
| 3,295,795 | 1/1967 | Meek, Jr. et al. | 244/17.17 |
| 3,559,204 | 1/1971 | Dashper | 200/85 R X |
| 3,634,635 | 3/1970 | Ellis | 200/52 R |
| 3,718,792 | 5/1972 | Stagner | 200/85 R |
| 3,891,964 | 7/1974 | Geiger | 340/440 |
| 3,936,622 | 4/1974 | McElroy | 200/85 R |
| 4,007,970 | 2/1977 | Romero | 303/93 |
| 4,172,570 | 10/1979 | Leoni | 244/17.17 |
| 4,270,711 | 6/1981 | Cresap et al. | 244/17.17 |
| 4,334,955 | 6/1982 | Zoeke | 159/44 |
| 4,430,533 | 11/1981 | Vatterott | 200/61.41 |
| 4,574,360 | 4/1983 | Bateman | 364/567 |
| 4,850,552 | 7/1989 | Darden et al. | 244/100 R |

*Primary Examiner*—J. R. Scott
*Attorney, Agent, or Firm*—Richards, Medlock & Andrews

[57] ABSTRACT

A self-adjusting slide assembly is provided for mounting a weight on gear switch to an aircraft. The slide assembly is particularly adapted for mounting on a skid equipped helicopter for responding to vertical oscillatory deflection of a cross tube of the skid landing gear. A mounting bracket is attached to the underside of the helicopter for supporting a back plate and a pair of clamp plates. A C-shaped slide member has a flange mounted between the back plate and clamp plates so as to slide vertically. Take-off and landing stresses cause the cross tube to exhibit vertical oscillatory deflection between an upper arm and a lower arm of the slide member. A microswitch mounted on the lower arm is actuated when the cross tube contacts a bottom bumper on the lower arm while the helicopter is fully on skid gear. Any deviation of the cross tube beyond its normal limits of deflection causes the upper and lower arms of the slide member to move with respect to the mounting bracket to establish new limits for cross tube oscillatory deflection. Thus, the microswitch maintains approximately the same relative position with respect to the mean position of the cross tube oscillatory deflection regardless of any permanent deformation of the cross tube resulting from harder than normal landings.

12 Claims, 1 Drawing Sheet

SELF-ADJUSTING SLIDE ASSEMBLY FOR WEIGHT ON GEAR SWITCH

TECHNICAL FIELD

This invention relates to aircraft weight on gear switches and, in particular, to a self-adjusting slide assembly for mounting an aircraft weight on gear switch.

BACKGROUND OF THE INVENTION

Sophisticated aircraft generally include a weight on gear switch for activating and deactivating various aircraft systems and flight controls depending upon whether the aircraft is airborne or fully supported by the landing gear on the ground. In some aircraft, such as helicopters, the weight on gear switch also provides an indication to the pilot that the aircraft is either airborne or on the ground.

Aircraft weight on gear switches, or squat switches, are typically actuated by a main landing gear strut when compressed to support the weight of the aircraft. On helicopters with skid landing gear systems, paddles or similar devices have been used to actually contact the ground surface upon landing of the helicopter. However, switches designed to contact the ground are generally unreliable because of collection of dirt and debris or damage from skid movement and objects on the ground. In addition, ground contact switches can give erroneous indications when the helicopter is landing on uneven terrain.

Other types of helicopter weight on gear switches have been based on collective stick position or engine torque. However, these types of switches generally can be overridden by the pilot so that they can indicate the aircraft is airborne when it is actually on the ground.

Another type of weight on gear switch for skid gear helicopters is mounted so as to detect deflection of a cross tube of the skid landing gear. This placement of the weight on gear switch overcomes many of the disadvantages of the ground contact or collective stick position switches. However, switches mounted to indicate deflection of the skid gear cross tube require periodic adjustment as a result of repeated cross tube deflection from normal landings and permanent deformation from harder than normal landings. Without such periodic adjustment, weight on gear switches can give erroneous indications that can affect flight safety.

Therefore, there is a need for a mounting assembly for a helicopter weight on gear switch that is self-adjusting both for normal landing deflection of the skid gear cross tube and for permanent deformation of the cross tube resulting from hard landings.

SUMMARY OF THE INVENTION

The present invention is a self-adjusting slide assembly for an aircraft weight on gear switch. A preferred embodiment of the slide assembly is particularly adapted for mounting a weight on gear switch to detect the oscillatory deflection of a skid landing gear cross tube on a helicopter.

A mounting bracket of the self-adjusting slide assembly is mounted to the underside of the helicopter fuselage in close proximity to the center of a cross tube of the skid landing gear. A back plate extends vertically downward from the mounting bracket. A pair of vertical clamp plates are attached to the back plate by fastening means so as to form a vertical channel between the clamp plates and a vertical groove between each of the clamp plates and the back plate. A slide member has a T-shaped flange along one edge thereof for slidably mounting in the channel and grooves formed by the back plate and the clamp plates. The fastening means may be tightened or loosened to adjust the force necessary to move the slide member vertically in the channel and grooves.

The slide member has a generally C-shaped configuration with upper and lower arms. The slide member is mounted so that the arms extend above and below the cross tube of the helicopter skid landing gear. During take-off and landing, the cross tube of the landing gear deflects a known distance in the vertical direction. Deflection of the cross tube causes it to contact a top bumper on the upper arm when the helicopter is airborne and to contact a bottom bumper on the lower arm when the weight of the helicopter is on the landing gear. A microswitch is mounted on the lower arm so as to extend vertically just above the bottom bumper. When the helicopter lands, the microswitch is activated by the cross tube as it deflects against the bottom bumper. The bottom bumper protects the microswitch from damage by limiting the extent of contact between the cross tube and the microswitch. The top and bottom bumpers of the slide member are spaced apart to accommodate the normal vertical oscillatory deflection of the cross tube about a mean position during take-off and landing.

Although the microswitch is mounted on the slide member to detect the normal range of cross tube deflection, repeated landings or harder than normal landings can cause the cross tube to be temporarily or permanently deflected from its original mean position with respect to the helicopter. However, the slide assembly of the present invention automatically adjusts the position of the microswitch during each take-off and landing cycle of the helicopter to correspond to any change in the mean position of the cross tube. For example, if the cross tube is permanently deflected downward during a hard landing, the cross tube contacts the bottom bumper and moves the entire slide member downward relative to the bracket attached to the fuselage of the helicopter. Thus, the microswitch on the lower arm is moved downward an amount corresponding to the permanent deflection of the cross tube so that the normal downward deflection of the cross tube upon landing continues to actuate the microswitch.

BRIEF DESCRIPTION OF THE DRAWINGS

For a more complete understanding of the present invention and for further advantages thereof, reference is made to the following Description of the Preferred Embodiment taken in conjunction with the accompanying Drawings, in which.

DESCRIPTION OF THE PREFERRED EMBODIMENT

Figure 1:
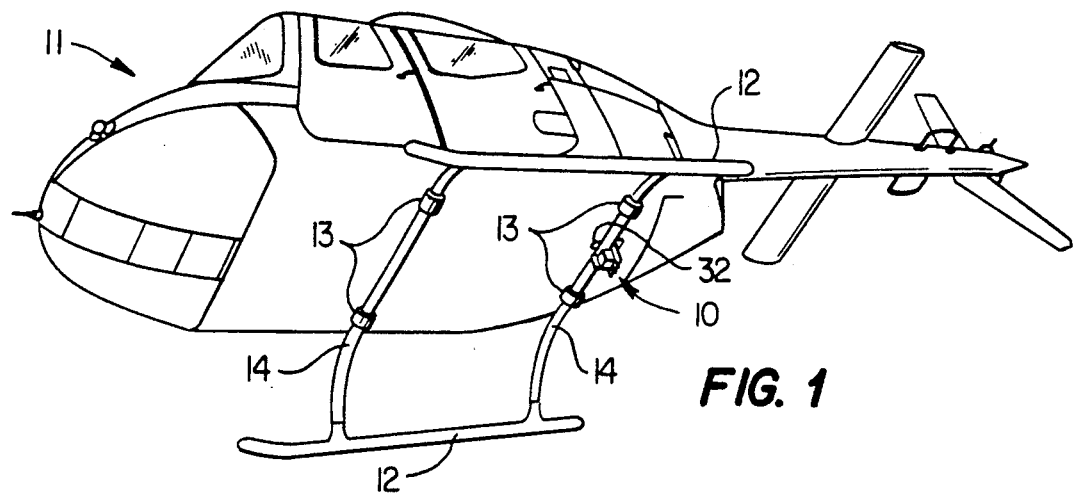
FIG. 1 illustrates the installation of the present invention on a helicopter having a skid landing gear system.

FIG. 1 shows a self-adjusting slide assembly 10 of the present invention mounted on the underside of the fuselage of a helicopter 11. Helicopter 11 is equipped with a skid landing gear assembly 12 including a cross tube 14 attached to helicopter 11 by mounting points 13. Slide assembly 10 is mounted in close proximity to the center of the cross tube 14 between mounting points 13 so that vertical oscillatory deflection of cross tube 14 about a mean position actuates a weight on gear switch to indicate whether helicopter 11 is airborne or on the ground. Assembly 10 should preferably be mounted on rear cross tube 14, as excessive aft cyclic can transfer virtually the entire weight of the helicopter from front cross tube 14 to rear cross tube 14 when the helicopter is on the ground. A weight on gear switch mounted to front cross tube 14 in this situation would falsely indicate that the helicopter was airborne. This phenomenon, however, is not normally exhibited with rear cross tube 14 when full forward cyclic is applied, thus making the rear cross tube 14 the preferred position for attachment at assembly 10. While two switches can be used, one on the front and one on the rear cross tube, preferably only one at the rear cross tube is used.

Figure 2:
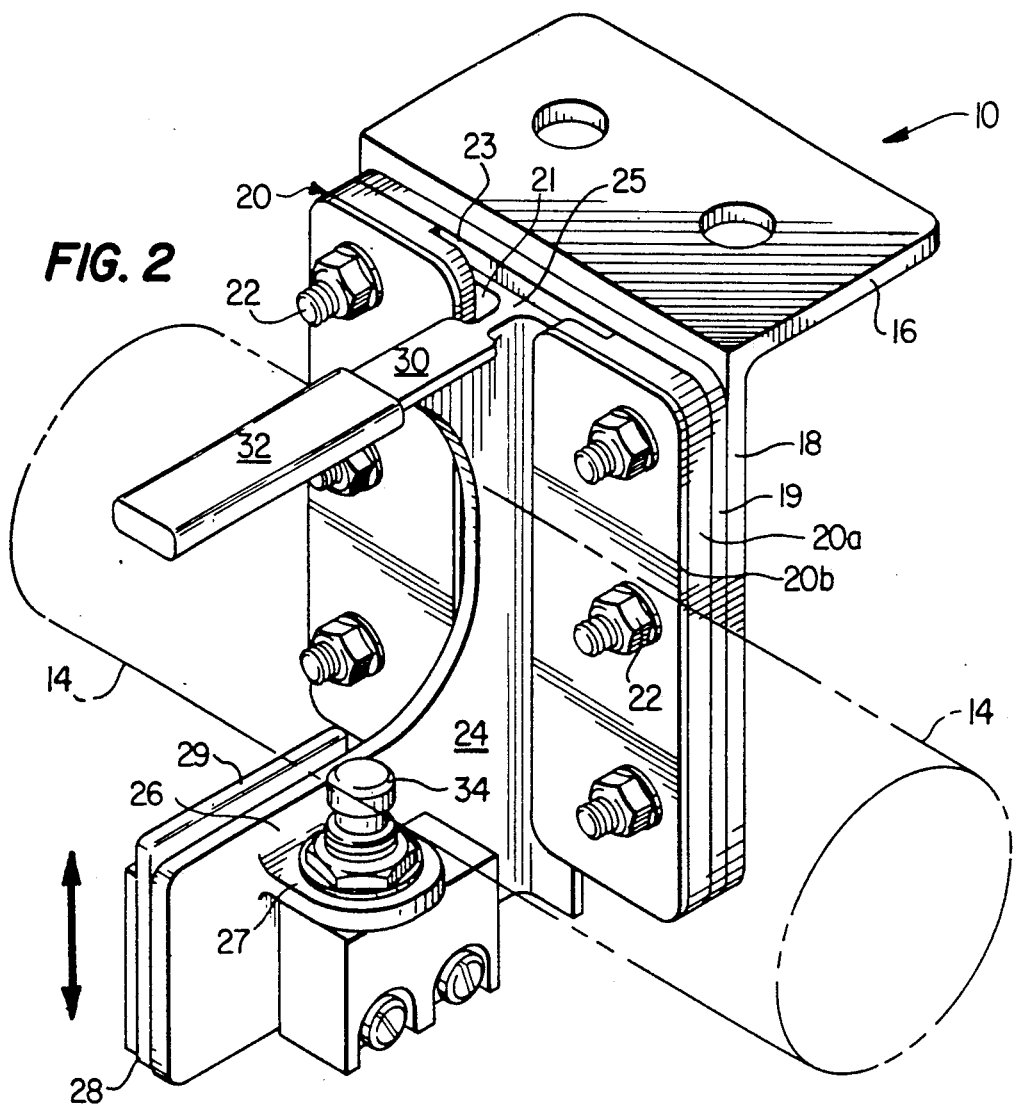
FIG. 2 is a perspective view of the self-adjusting slide assembly of the present invention.

FIG. 2 is a perspective view of slide assembly 10 removed from helicopter 11. Slide assembly 10 includes a mounting bracket 16 for mounting slide assembly 10 to the underside of helicopter 11. A back plate 18 extends vertically downward from mounting bracket 16. Back plate 18 may comprise an extension of mounting bracket 16 and/or a separate spacer plate 19 attached to mounting bracket 16. A pair of vertical clamp plates 20 are attached to back plate 18 by a plurality of fastening means 22, such as nuts, bolts, and washers. Clamp plates 20 may be laminated or include multiple plates such as an inner wear plate 20a and an outer support plate 20b. Clamp plates 20 are attached to back plate 18 so as to provide a vertical channel 21 between clamp plates 20 and a vertical groove 23 between each clamp plate 20 and spacer plate 19.

In the preferred embodiment, mounting bracket 16 and back plate 18 are constructed of metal. Spacer plate 19 and inner wear plate 20a are preferably constructed from a self-lubricating plastic such as Teflon or Kel-F. Outer wear plate 20b is preferably constructed of metal. The use of self-lubricating plastics is useful for ease of maintenance. It is possible to use metal in place of plastic, however, use of metal would require maintenance, lubrication and preferably a cover to prevent contamination of the surfaces.

A generally C-shaped slide member 24 has a T-shaped flange 25 along its vertical edge. T-shaped flange 25 is adapted to be engaged between clamp plates 20 and spacer plate 19 so that slide member 24 extends through vertical channel 21 and flange 25 slides in grooves 23 between clamp plates 20 and spacer plate 19. Clamp plate 20a and spacer plate 19 should be made of Teflon or a similar self-lubricating plastic material having a coefficient of friction that facilitates sliding movement of slide member 24 in grooves 23 between clamp plates 20 and spacer plate 19. In order to prevent corrosion, flange 25 should preferably be made of stainless steel. Other suitable materials would include Teflon coated or plastic coated metal parts.

Slide member 24 has a lower arm 26 that includes a switch mount 27 and a slot 28 for confining a bottom bumper 29. Slide member 24 also has an upper arm 30 with a top bumper 32. Top bumper 32 may comprise, for example, a section of shrink tubing formed about upper arm 30.

Slide member 24 is mounted so that upper arm 30 extends above cross tube 14 and lower arm 26 extends below cross tube 14. Arms 26 and 30 are designed to extend past the landing edge of cross tube 14 so as to prevent decoupling from assembly 10 upon deflection of the cross tube during a run on landing. A horizontal extension of about ⅛ inch beyond the leading edge of the cross tube, which is sized to incur a vertical deflection of about 0.5 inches when weight of the helicopter is added to the landing gear, has been found to be sufficient for this purpose in the current embodiment of assembly 10. The degree of extension of arms 26 and 30 can be of any length sufficient to prevent decoupling of the assembly when the cross tube deflects. Preferably, the assembly 10 is mounted such that back plate 18 is on the rear side of the cross tube.

During take-off and landing, cross tube 14 normally deflects from a lower position against bottom bumper 29 when the weight of helicopter 11 is fully on skid gear 12, to an upper position against top bumper 32 when helicopter 11 is airborne. A microswitch 34 mounted on switch mount 27 extends vertically slightly above bottom bumper 29 so that cross tube 14 actuates microswitch 34 when helicopter 11 is fully on skid gear 12 and cross tube 14 is in contact with bottom bumper 29. Bottom bumper 29 protects microswitch 34 from any hard contact with cross tube 14. As will be appreciated, the bumpers are spaced to accommodate the normal deflection of the cross tube. The switch mechanism should have a sufficient length of travel for activation to prevent false signals from vibrations. Also preferable, the switch is spaced apart from the cross tube when there is no weight on the gear. It has been found that a cross tube, sized to deflect about 0.5 inches in the vertical direction when the weight of the helicopter is added to the landing gear, can be usefully employed in the present invention. A switch having a travel of about 0.125 inches or more has been found useful in the present invention.

After repeated landings or harder than normal landings, the mean position of the oscillatory deflection of cross tube 14 may become temporarily or permanently displaced from its original position with respect to mounting bracket 16. In prior art weight on gear switches, excessive deflection of cross tube 14 could cause erroneous flight indications affecting flight safety unless the position of the weight on gear switch was manually adjusted.

During normal take-offs and landings, cross tube 14 exhibits oscillatory deflection between top bumper 32 and bottom bumper 29, and actuates microswitch 34 when in contact with bottom bumper 29. Because slide member 24 is slidably mounted between spacer plate 19 and clamp plates 20, any deflection of cross tube 14 beyond its normally established limits causes slide member 24 to slide so that top bumper 32 and bottom bumper 29 define new limits for oscillatory deflection of cross tube 14. For example, if a harder than normal landing causes cross tube 14 to deflect, temporarily or permanently, further from the fuselage of helicopter 11, cross tube 14 contacts bottom bumper 29 and forces slide member 24 to slide downward to the limit of the downward deflection of cross tube 14. Because microswitch 34 is mounted on lower arm 26, its position is moved downward a distance corresponding to the downward deflection of cross tube 14 against bottom bumper 29. Likewise, any upward deflection of cross tube 14 beyond its normally established limit causes cross tube 14 to contact top bumper 32 and move slide member 24 upward. Thus, microswitch 34 always maintains approximately the same relative position with respect to the mean position of the oscillatory deflection of cross tube 14 regardless of any permanent deformation of cross tube 14.

The pressure between plates 20a and 19 and flange 25 is regulated by the torque applied to bolts 22. In order to properly compensate for oscillatory deflection of cross tube 14, this pressure should be such that approximately 35 pounds of force is required to move slide member 24 vertically up or down through vertical channel 21. Greater or lesser torque can be applied to the bolts to adjust the force required to move the slide member. The force selected before movement of the slide member is allowed can vary and be adjusted depending upon the degree of sensitivity desired, the size of the helicopter and the deflection characteristics of the cross tube.

Although the present invention has been described with respect to a specific embodiment particularly adapted for skid gear helicopters, various changes and modifications may be suggested to one skilled in the art to adapt the present invention to other landing gear systems, for example, and it is intended that the present invention encompass such changes and modifications as fall within the scope of the appended claims.

We claim:

1. A slide assembly for mounting an aircraft weight on gear switch, comprising:
   a mounting bracket rigidly attached to the aircraft and having mounting structure of a predetermined shape formed therein; and
   a slidable member having structure formed therein to slidably mate with said mounting structure of said mounting bracket, said slidable member including means for mounting the weight on gear switch a predetermined distance from the mean position of the oscillatory movement of the aircraft landing gear, a first member and a second member, said first and second members extending, respectively, above and below a component of the aircraft landing gear;
   whereby said slidable member is responsive to contact by the oscillatory movement of the aircraft landing gear about a mean position to move and to maintain the switch at a substantially constant predetermined distance from the mean position.

2. The slide assembly of claim 1, wherein said mounting bracket comprises:
   a back plate; and
   a clamp plate fastened to said back plate to form said mounting structure.

3. The slide assembly of claim 2, wherein said mounting structure comprises a channel.

4. The slide assembly of claim 3, wherein said structure formed in said slide member comprises a T-shaped flange along a vertical edge thereof for slidably mounting said slide member in said channel.

5. A slide assembly for mounting a switch to a support, comprising:
   a mounting bracket rigidly attached to the support and having mounting structure of a predetermined shape formed therein; and
   a slidable member having structure formed therein to slidably mate with said mounting structure of said mounting bracket for slidably mounting said slidable member to said mounting bracket, a first member extending a predetermined distance above the mean position of an oscillating member, a second member extending a predetermined distance below the mean position of the oscillating member and means for mounting the switch a predetermined distance from the mean position of the oscillating member;
   whereby said slidable member slides with respect to said mounting bracket in response to contact by the oscillating member to maintain the switch at a substantially constant predetermined distance from the mean position of the oscillating member as the mean position varies with respect to the support.

6. The slide assembly of claim 5, wherein said support comprises an aircraft and said oscillating member is connected to a landing gear system of the aircraft.

7. In a helicopter having a weight on gear switch actuated by oscillatory deflection of a landing skid cross tube about a mean position, a slide assembly comprising:
   a mounting bracket rigidly attached to the helicopter and having mounting structure of a predetermined shape formed therein;
   a C-shaped slide member having structure formed therein to slidably mate with said mounting structure of said mounting bracket for slidably mounting said slide member to said mounting bracket;
   an upper arm of said slide member extending above the cross tube; and
   a lower arm of said slide member extending below the cross tube and having the weight on gear switch mounted thereon at a predetermined distance from the mean position of the cross tube.

8. The slide assembly of claim 7, wherein said mounting bracket comprises:
   a back plate; and
   a clamp plate fastened to said back plate so as to form said mounting structure for mounting said slide member.

9. The slide assembly of claim 8, wherein said mounting structure comprises a channel.

10. The slide assembly of claim 9, wherein said structure formed in said slide member comprises a T-shaped flange along a vertical edge thereof for slidably mounting said slide member in said channel.

11. The slide assembly of claim 10, wherein said upper and lower arms define approximate upper and lower limits, respectively, of the cross tube oscillatory deflection.

12. The slide assembly of claim 11, wherein deflection of the cross tube beyond said limits causes said slide member to slide with respect to said mounting bracket so that the weight on gear switch maintains a substantially constant distance from the mean position of the cross tube.

* * * * *